(12) United States Patent
Inoue et al.

(10) Patent No.: US 7,148,308 B2
(45) Date of Patent: Dec. 12, 2006

(54) ONE-PART MOISTURE-CURING URETHANE COMPOSITION

(75) Inventors: Atsushi Inoue, Takatsuki (JP); Yoshinori Mayama, Takatsuki (JP); Yoshihiro Nakata, Takatsuki (JP)

(73) Assignee: Sunstar Giken Kabushiki Kaisha, Osaka-fu (JP)

( * ) Notice: Subject to any disclaimer, the term of this patent is extended or adjusted under 35 U.S.C. 154(b) by 0 days.

(21) Appl. No.: 10/489,819

(22) PCT Filed: Oct. 1, 2002

(86) PCT No.: PCT/JP02/10205

§ 371 (c)(1), (2), (4) Date: Mar. 17, 2004

(87) PCT Pub. No.: WO03/031518

PCT Pub. Date: Apr. 17, 2003

(65) Prior Publication Data

US 2004/0238116 A1    Dec. 2, 2004

(30) Foreign Application Priority Data

Oct. 2, 2001 (JP) .............................. 2001-306318

(51) Int. Cl.
*C08G 18/10* (2006.01)

(52) U.S. Cl. .................... 528/59; 525/456; 525/504; 524/871; 524/875

(58) Field of Classification Search ................ 528/59; 525/456, 504; 524/871, 875
See application file for complete search history.

(56) References Cited

U.S. PATENT DOCUMENTS

| | | | |
|---|---|---|---|
| 3,931,077 A | | 1/1976 | Uchigaki et al. |
| 4,048,103 A | * | 9/1977 | Graham .................. 428/63 |
| 4,143,009 A | * | 3/1979 | Dewey ................... 528/74.5 |
| 4,625,012 A | * | 11/1986 | Rizk et al. ................ 528/28 |
| 4,836,909 A | * | 6/1989 | Matsuo et al. ............ 208/72 |
| 5,631,318 A | * | 5/1997 | Ito et al. .................. 524/590 |
| 6,635,711 B1 | * | 10/2003 | Miskovic et al. .......... 525/127 |

FOREIGN PATENT DOCUMENTS

| | | | |
|---|---|---|---|
| EP | 0 289 945 | | 11/1988 |
| JP | 60024245 | * | 2/1985 |
| JP | 63278926 | | 11/1988 |
| JP | 5065471 | | 3/1993 |
| JP | 5 140532 A | | 6/1993 |
| JP | 5 345867 | | 12/1993 |
| JP | 11263963 | | 9/1999 |
| JP | 11 293221 A | | 10/1999 |
| JP | 2000297264 | | 10/2000 |
| JP | 2001354946 | | 12/2001 |
| JP | 2002053634 | | 2/2002 |
| WO | WO 9932535 | | 7/1999 |

OTHER PUBLICATIONS

"Nikanol Technical Brochure" 1000, http://www.mgc-a.com/nikanol/nik-bro.html XP002303303.

* cited by examiner

*Primary Examiner*—Rachel Gorr
(74) *Attorney, Agent, or Firm*—Jacobson Holman PLLC

(57) ABSTRACT

The present invention provides an one-part moisture-curable urethane composition which exhibits excellent adhesion particularly to a coated steel plate difficult to bond with no-primer and is useful in the bonding of automobile window glass. The urethane composition of the present invention comprises an isocyanate-terminated urethane prepolymer as the main component, and additional components comprising (A) a compound having solubility parameter value of 6.0 to 9.0 and/or (B) a compound having in the molecule at least one structure represented by the following formula:

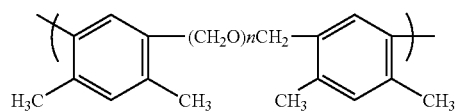

(wherein n is 0 to 3).

20 Claims, No Drawings

ONE-PART MOISTURE-CURING URETHANE COMPOSITION

This is a nationalization of PCT/JP02/10205 filed Oct. 1, 2002 and published in Japanese.

TECHNICAL FIELD

The present invention relates to an one-part moisture-curable urethane composition, and more particularly an one-part moisture-curable urethane composition comprising as the main component an isocyanate-terminated urethane prepolymer containing an isocyanate group at the molecular terminal, to which a little incompatible compound with an urethane prepolymer and/or a compound having a specific structure formula is formulated, whereby being exhibited excellent adhesion particularly to a coated steel plate difficult to bond with no-primer and being useful in the bonding of automobile window glass.

BACKGROUND ART

An one-part moisture-curable urethane composition has been used for the bonding of automobile window glass, which comprises as the main component the above-mentioned isocyanate-terminated urethane prepolymer, to which a plasticizer, a filler, a curing catalyst and the like are generally formulated. It is, however, generally difficult to directly bond to a glass and a coated steel plate with the one-part moisture-curable urethane composition with no-primer, and hence, generally a primer treatment is necessary to bond a glass and a coated steel plate, accordingly no-primer has been demanded from the viewpoint of processes without using any primer and an improvement of working environment.

DISCLOSURE OF INVENTION

When the present inventors have intensively studies for achievement to adhere to various coated steel plates without using any primer with one-part moisture-curable urethane composition, they found that if a little incompatible compound with an isocyanate-terminated urethane prepolymer of the main component and/or a compound having a specific structure formula is formulated so that the desired adhesion can be achieved to a coated steel plate with no-primer application, and hence, they completed the present invention.

Thus, according to the present invention there is provided an one-part moisture-curable urethane composition which comprises an isocyanate-terminated urethane prepolymer as the main component, and additional components comprising
(A) a compound having a solubility parameter value of 6.0 to 9.0 and/or
(B) a compound having in the molecule at least one (preferably 1 to 100) specific structure represented by the following formula X:

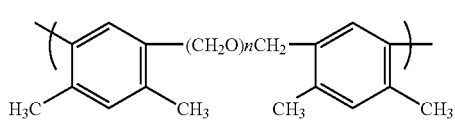

(wherein n is 0 to 3).

The above-mentioned isocyanate-terminated urethane prepolymer (hereinafter referred to as NCO-terminated prepolymer) employed as the main component in the present invention is prepared by reacting excessive polyisocyanate compound (typically OH/NCO=1/1.5 to 1/4.0) with one or more various polyols by a usual method.

The above-mentioned polyol includes, for example, polyether polyol such as polyoxyalkylene polyol (referred to as PPG), modified polyether polyol, polytetramethylene ether glycol; polyester polyol such as condensation-type polyester polyol, lactone-type polyester polyol, polycarbonatediol; polyol wherein a main chain including a C—C bond such as acryl polyol, polybutadiene-type polyol, polyolefin-type polyol, saponified ethylene-vinyl acetate copolymer; other flame-retardant polyol, phosphorus-containing polyol, halogen-containing polyol and the like.

The above-mentioned polyisocyanate compound includes, for example, tolylene diisocyanate (TDI), 4,4'-diphenylmethane diisocyanate (MDI), xylylene diisocyanate (XDI), hexamethylene diisocyanate (HDI), isophorone diisocyanate (IPDI), lysine diisocyanate, isopropylidenebis (4-cyclohexyl isocyanate), hydrogenated XDI and the like.

The above-mentioned compound (A) (hereinafter referred to as predetermined SP compound) having a solubility parameter value (SP value) of 6.0 to 9.0, preferably 7.0 to 8.0 in the present invention includes, for example, aliphatic hydrocarbon compound, specifically polybutene, polyisobutylene (SP value of 7.7); alkoxysilyl group-containing isobutylene polymer ['Epion' series manufactured by KANEKAFUCHI CHEMICAL INDUSTRY CORPORATION, such as 'Epion EP505S' (molecular weight of approximately 20000)] (SP value of 7.8 to 8.0); paraffin oil (SP value of 6.0 to 8.0) and the like.

In particular, predetermined SP compound denotes compatibility relation with NCO-terminated prepolymer in the present invention, but the basic technical conception of the present invention is characterized in that SP value of NCO-terminated prepolymer does not approximate to that of predetermined SP compound, so that NCO-terminated prepolymer and predetermined SP compound is a little incompatibility relation in the present invention.

Also, the above-mentioned compound (B) having the specific structure X used instead of or together with the above-mentioned predetermined SP compound includes, for example, the trade name of 'Nikanol' manufactured by MITSUBISHI GAS CHEMICAL COMPANY, INC.

Such a compound (B) may be reacted by addition reaction with a polyisocyanate compound which is a raw material for preparation of the above-mentioned NCO-terminated prepolymer, or this reaction product may be reacted further with the polyol (in this case, preferably low-molecular glycol having molecular weight of 300 or less) in such a manner as described in the below-mentioned example(s), which formulated modifications of reaction product in the one-part moisture-curable urethane composition of the present invention are superior to the storage stability and cured physical properties.

The present invention is an one-part moisture-curable urethane composition which exhibits an excellent adhesion to a coated steel plate with using no-primer and useful in the bonding of automobile window glass, and the urethane composition can be used in a paste state with a high viscosity at room temperature, or also in a so-called hotmelt type which is apparently solid state with no fluidity at room temperature and can be fluid at heating.

BEST MODE FOR CARRYING OUT THE INVENTION

An one-part moisture-curable urethane composition according to the present invention is composed of a system that the above-mentioned NCO-terminated prepolymer is the main component, to which a plasticizer, a filler, a curing catalyst are generally formulated and further the above-mentioned predetermined SP compound and/or the above-mentioned compound (B) having the specific structure X are added. Here, the content of the NCO-terminated prepolymer (main component) may be usually selected from the range of 20 to 60% (% by weight, hereinafter denoting the same) in the whole composition.

On the one hand, the content of the above-mentioned predetermined SP compound may be selected from the range of 0.5 to 20%, preferably 2 to 10% in the whole composition. The content of less than 0.5% is inferior to adhesion to a coated steel plate with no-primer, while the content of more than 20% is inferior to the workability and the cured physical properties of the composition.

Also, the content of the above-mentioned compound (B) may be selected from the range of 0.5 to 20%, preferably 2 to 10% in the whole composition. The content of less than 0.5% is inferior to adhesion to a coated steel plate with no-primer, while the content of more than 20% is inferior to the workability of the composition.

The above-mentioned plasticizer includes, for example, diisononyl phthalate, dioctyl phthalate (DOP), dibutyl phthalate, dilauryl phthalate, butyl benzyl phthalate, dioctyl adipate, diisodecyl adipate, trioctyl phosphate, tris(chloroethyl)phosphate, tris(dichloropropyl)phosphate, propylene glycol adipate polyester, butylene glycol adipate polyester, epoxy alkyl stearate, alkylbenzene, epoxylated soyabean oil, and the like; the content may be usually selected from the range of 0 to 50% in the whole composition.

The above-mentioned filler includes, for example, calcium carbonate, silica, carbon black, clay, talc, titanium oxide, quicklime, kaolin, zeolite, diatomaceous earth, and the like; the content may be usually selected from the range of 0 to 50% in the whole composition.

The above-mentioned curing catalyst includes, for example, organic tin compound (such as dibutyltin diacetylacetonate, dibutyltin dilaurate, dioctyltin dilaurate, dibutyltin maleate, dioctyltin maleate, tin octoate); 2,2'-dimorpholinodiethyl ether, di(2,6-dimethylmorpholinoethyl)ether; bismuth carboxylate (such as bismuth 2-ethylhexanoate, bismuth octoate, bismuth neodecanoate); carboxylic acid (such as benzoic acid, phthalic acid, 2-ethyl hexanoic acid, octoic acid, stearic acid, oleic acid, linolic acid); the content may be usually selected from the range of 0.0001 to 5% in the whole composition.

In addition, there may be optionally formulated adhesive promoter [including one or two or more selected from modified polyisocyanate compound having molecular weight of less than 1000 (such as buret-modified hexamethylene diisocyanate, modified isocyanurate, modified trimethylolpropane); reaction product of the above-mentioned polyisocyanate compound with alkoxysilyl group-containing compound (such as mercaptopropyltrimethoxysilane, mercaptopropylmethyldimethoxysilane, γ-N-phenylaminopropyltrimethoxysilane, γ-isocyanatopropyltrimethoxysilane; and additionally alkoxysilyl group-containing polyurethane-based polymer, alkoxysilyl group-containing polyether-based polymer, alkoxysilyl group-containing vinyl-based polymer, alkoxysilyl group-containing polyester-based polymer, alkoxysilyl group-containing diene-based polymer, alkoxysilyl group-containing polyalkylene-based polymer and the like); and the above-mentioned alkoxysilyl group-containing compound; the content thereof may be usually selected from the range of 0.1 to 10% in the whole composition]; and furthermore there may be formulated solvent (such as xylene, toluene); other aging inhibitor, antioxidant, ultraviolet absorbing agent, pigment and the like in a suitable quantity.

Hereinafter, the present invention will be described in more detail in reference to the following Examples and Comparative Examples.

EXAMPLE 1

(1) Synthesis of an NCO-terminated Prepolymer 350 g of 4,4'-diphenylmethane diisocyanate (MDI) was added to 3000 g of polyoxypropylene triol having hydroxyl value of 25.0 and the mixture was reacted under a nitrogen atmosphere at a temperature of 80° C. for 3 hours to obtain an NCO-terminated prepolymer having NCO group content of 1.90% and viscosity of 50000 mPa·S (20° C.).

(2) Synthesis of an Urethane-modified Compound (B)

40 g of diethylene glycol and MDI (120 g) were added to 800 g of a compound (B) ('Nikanol HH' manufactured by MITSUBISHI GAS CHEMICAL COMPANY, INC.) having hydroxyl value of 35.0 and molecular weight of 550, represented by the formula:

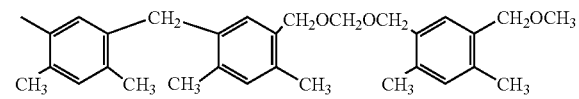

and the mixture was reacted under a nitrogen atmosphere at a temperature of 80° C. for 3 hours to obtain an urethane-modified compound (B) having NCO group content of 0.1%.

(3) Preparation of an One-part Moisture-curable Urethane Composition 300 parts (parts by weight, hereinafter denoting the same) of diisononyl phthalate, 350 parts of dry carbon black, 250 parts of dry calcium carbonate, 75 parts of polybutene having SP value of 7.7, 75 parts of the urethane-modified compound (B) from said (2), 30 parts of buret-modified hexamethylene diisocyanate, 1 part of 2,2'-dimorpholinodiethyl ether and 0.3 part of dibutyltin dilaurate were added to 500 parts of the NCO-terminated prepolymer from said (1) and these were mixed while stirring under reduced pressure to obtain an one-part moisture-curable urethane composition.

EXAMPLE 2

An one-part moisture-curable urethane composition was obtained in the same manner as in Example 1/(3) except for replacing 75 parts of polybutene having SP value of 7.7 with 75 parts of-polyisobutylene having SP value of 7.7.

EXAMPLE 3

An one-part moisture-curable urethane composition was obtained in the same manner as in Example 1/(3) except for replacing 75 parts of polybutene having SP value of 7.7 with 75 parts of alkoxysilyl group-containing isobutylene-based polymer ('Epion EP505S' manufactured by KANEKAFUCHI CHEMICAL INDUSTRY CORPORATION) having SP value of 7.9.

EXAMPLE 4

An one-part moisture-curable urethane composition was obtained in the same manner as in Example 1/(3) except for omitting 75 parts of polybutene having SP value of 7.7.

EXAMPLE 5

An one-part moisture-curable urethane composition was obtained in the same manner as in Example 1/(3) except for omitting 75 parts of the urethane-modified compound (B).

COMPARATIVE EXAMPLE 1

An one-part moisture-curable urethane composition was obtained in the same manner as in Example 1/(3) except for omitting 75 parts of polybutene having SP value of 7.7 and 75 parts of the urethane-modified compound (B).

Adhesion Test:

With regard to the urethane composition of Examples 1 to 5 and Comparative Example 1, the urethane composition was directly applied in a bead state on a steel plate coated with two kinds of automobile paints, to which released paper was superposed and bonded such that the thickness of the adhesive was 3 mm, followed by left to stand at 20° C. and RH of 65% for 72 hours. After being cured, a peeling test was performed with knife cutting to evaluate no-primer adhesion. The results are shown in the following Table 1.

TABLE 1

|  | Example | | | | | Comparative |
| --- | --- | --- | --- | --- | --- | --- |
|  | 1 | 2 | 3 | 4 | 5 | Example 1 |
| High Solid Paint | CF 100 | CF 100 | CF 100 | CF 50 | CF 75 | AF 100 |
| Easy Maintenance Paint | CF 100 | CF 100 | CF 100 | CF 50 | CF 75 | AF 100 |

In Table 1,
CF: cohesive failure of the adhesive
AF: interfacial failure between the surface of the coated steel plate and the adhesive
number denotes area ratio.

It is confirmed from the results of Table 1 that the present invention (Examples 1 to 5) exhibits excellent adhesion to a coated steel plate difficult to bond without using any primer.

INDUSTRIAL APPLICABILITY

The one-part moisture-curable urethane composition according to the present invention is particularly useful in the bonding of automobile window glass, and but it is needless to say that the present composition is applicable as an adhesive and a sealant in extensive field of construction, engineering work, etc.

What is claimed is:

1. A one-part moisture-curable urethane composition which comprises
   a) an isocyanate-terminated urethane prepolymer as a main component and
   b) additional components comprising
      (A) one or more compounds selected from the group consisting of an aliphatic hydrocarbon compound and an alkoxysilyl group-containing isobutylene polymer, the one or more compounds having a solubility parameter value of 6.0 to 9.0, and
   (B) a compound having in the molecule at least one structure represented by the following formula:

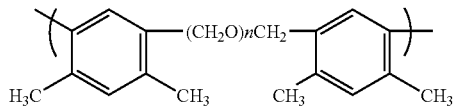

wherein n is 0 to 3.

2. The one-part moisture-curable urethane composition according to claim 1, wherein the compound (A) is an aliphatic hydrocarbon compound.

3. The one-part moisture-curable urethane composition according to claim 1, wherein molecular weight of the basic structure of the compound (B) is at least 250.

4. The one-part moisture-curable urethane composition according to claim 1, wherein the content of the compound (A) is 0.5 to 20% by weight in the whole composition.

5. The one-part moisture-curable urethane composition according to claim 2, wherein the content of the compound (A) is 0.5 to 20% by weight in the whole composition.

6. The one-part moisture-curable urethane composition according to claim 1, wherein the content of the compound (B) is 0.5 to 20% by weight in the whole composition.

7. The one-part moisture-curable urethane composition according to claim 3, wherein the content of the compound (B) is 0.5 to 20% by weight in the whole composition.

8. A one-part moisture-curable urethane composition which comprises
   a) an isocyanate-terminated urethane prepolymer as a main component,
   b) a urethane-modified compound obtained by reacting
      i) a compound (B) having in the molecule at least one structure represented by the following formula:

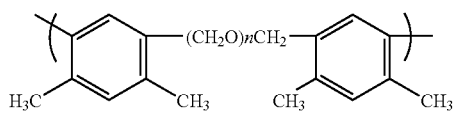

wherein n is 0 to 3, with
      ii) a polyisocyanate compound and optionally, further, with
      iii) a polyol, and
   c) one or more compounds (A) selected from the group consisting of an aliphatic hydrocarbon compound and an alkoxysilyl group-containing isobutylene polymer, the one or more compounds having a solubility parameter value of 6.0 to 9.0.

9. The one-part moisture-curable urethane composition according to claim 8, wherein molecular weight of the basic structure of the compound (i) is at least 250.

10. The one-part moisture-curable urethane composition according to claim 8, wherein the content of the compound (i) is 0.5 to 20% by weight in the whole composition.

11. The one-part moisture-curable urethane composition according to claim 9, wherein the content of the compound (i) is 0.5 to 20% by weight in the whole composition.

12. The one-part moisture-curable urethane composition according to claim 8, wherein the urethane-modified compound is obtained by reacting the compound (i) with the polyisocyanate compound (ii) and the polyol (iii), and wherein the polyol is a low-molecular glycol having a molecular weight of 300 or less.

13. The one-part moisture-curable urethane composition according to claim 1, wherein as a curing catalyst organic tin compound; and as adhesive promoter(s) one or two or more selected from modified polyisocyanate compound having molecular weight of less than 1000, reaction product of polyisocyanate compound with alkoxysilyl group-containing compound, and alkoxysilyl group-containing compound, are formulated.

14. The one-part moisture-curable urethane composition according to claim 8, wherein as a curing catalyst organic tin compound; and as adhesive promoter(s) one or two or more selected from modified polyisocyanate compound having molecular weight of less than 1000, reaction product of polyisocyanate compound with alkoxysilyl group-containing compound, and alkoxysilyl group-containing compound, are formulated.

15. The one-part moisture-curable urethane composition according to claim 1, the composition being used for bonding automobile window glass.

16. The one-part moisture-curable urethane composition according to claim 8, the composition being used for bonding automobile window glass.

17. A bonding method of automobile window glass which comprises bonding an automobile window glass to a coated steel plate of a car body without primer using the one-part moisture-curable urethane composition according to claim 1.

18. A bonding method of automobile window glass which comprises bonding an automobile window glass to a coated steel plate of a car body without primer using the one-part moisture-curable urethane composition according to claim 8.

19. The one-part moisture-curable urethane composition according to claim 8, wherein the compound (A) is an aliphatic hydrocarbon compound.

20. The one-part moisture-curable urethane composition according to claim 8, wherein the content of the compound (A) is 0.5 to 20% by weight in the whole composition.

* * * * *